(12) United States Patent
Eggersmann (10) Patent No.: US 11,059,760 B2
(45) Date of Patent: Jul. 13, 2021

(54) DEVICE FOR TREATING ORGANIC MATERIALS

(71) Applicant: KOMPOFERM GmbH, Marienfeld (DE)

(72) Inventor: Karlgünter Eggersmann, Marienfeld (DE)

(73) Assignee: KOMPOFERM GmbH, Marienfeld (DE)

( * ) Notice: Subject to any disclaimer, the term of this patent is extended or adjusted under 35 U.S.C. 154(b) by 489 days.

(21) Appl. No.: 15/946,224

(22) Filed: Apr. 5, 2018

(65) Prior Publication Data

US 2018/0346390 A1 Dec. 6, 2018

(30) Foreign Application Priority Data

Jun. 1, 2017 (EP) .................................... 17173934

(51) Int. Cl.
*C05F 17/979* (2020.01)
*C05F 17/964* (2020.01)

(52) U.S. Cl.
CPC .......... *C05F 17/979* (2020.01); *C05F 17/964* (2020.01)

(58) Field of Classification Search
CPC .............................. C05F 17/979; C05F 17/964
See application file for complete search history.

(56) References Cited

U.S. PATENT DOCUMENTS

2003/0024686 A1* 2/2003 Ouellette ............ F28D 15/0275
165/47

2007/0111305 A1* 5/2007 O'Neill ................. C05F 17/964
435/290.2

(Continued)

FOREIGN PATENT DOCUMENTS

| DE | 19719323 | * 11/1998 | .............. C05F 17/00 |
| DE | 19848157 A1 | 4/2000 | |
| EP | 0710636 A1 | 5/1996 | |

(Continued)

OTHER PUBLICATIONS

English machine translation of DE 19719323 from EPO (Year: 2020).*

(Continued)

*Primary Examiner* — William H. Beisner
*Assistant Examiner* — Danielle B Henkel
(74) *Attorney, Agent, or Firm* — Laurence P. Colton; Smith Tempel Blaha LLC (57) ABSTRACT

A device for treating organic materials having a nozzle base, a roof, a rear wall, and two side walls, delimiting the interior of the device. Extending in the nozzle base are tubes connected to nozzles in the nozzle base, directed toward the interior of the device. The tubes are connected to a process gas apparatus for supplying the tubes with process gas. The process gas apparatus includes a ventilator connected to a pressure chamber for feeding the pressure chamber with process gas. The pressure chamber has at least one outlet connected to at least one of the tubes in the nozzle base to conduct process gas from the pressure chamber into the tubes. The ventilator and the pressure chamber are situated on the roof of the device, in particular in an enclosure. The pressure chamber is connected to the tubes via at least one connecting line in the rear wall.

11 Claims, 6 Drawing Sheets

(56) References Cited

U.S. PATENT DOCUMENTS

2014/0154794 A1* 6/2014 Fotyga .................. C12M 29/02
                                                                435/290.2
2017/0226023 A1* 8/2017 Wang ...................... C12P 39/00

FOREIGN PATENT DOCUMENTS

| EP | 1847520 A2 | 10/2007 |
| EP | 2275763 A1 | 1/2011 |
| FR | 2820421 A1 | 8/2002 |
| WO | 2006120517 A2 | 11/2006 |

OTHER PUBLICATIONS

Klenck, Thomas "How It Works: the Air Compressor" pub Mar. 18, 2015 accessed Dec. 30, 2020, pp. 1-5 (Year: 2015).*
European Patent Office, Recherchenbericht (search in connection with a related application), Nov. 28, 2017.

* cited by examiner

DEVICE FOR TREATING ORGANIC MATERIALS

CROSS-REFERENCE TO RELATED APPLICATIONS

This patent application claims priority on and the benefit of European Patent Application No. 17 173 934.5 having a filing date of 1 Jun. 2017.

BACKGROUND OF THE INVENTION

Technical Field

The invention relates to a device for treating organic materials, in particular a compost tunnel, having a nozzle base, a roof, at least one rear wall, and two side walls that delimit the interior of the device, wherein extending in the nozzle base is a plurality of tubes that are connected to nozzles in the nozzle base that are directed toward the interior of the device, wherein the tubes are connected to a process gas apparatus which is designed for supplying the tubes with a process gas, in particular air, as needed, wherein the process gas apparatus includes a pressure chamber and a ventilator, wherein the ventilator is connected to the pressure chamber in such a way that it can feed the pressure chamber with process gas, wherein the pressure chamber has at least one outlet that is connected to at least one of the tubes in the nozzle base, so that the process gas may be conducted from the pressure chamber into the tubes to be fed.

Prior Art

Organic materials are also referred to below as "biomass."

Generic devices, which are designed in particular as compost tunnels, generally have a so-called nozzle base through which a gas, in particular air, may be introduced into the interior of the compost tunnel for carrying out the aerobic process, in particular a composting process. For this purpose, the nozzle base has a plurality of nozzles that are fed via corresponding tubes provided in the nozzle base. Since the biomass to be treated contains released or escaping moisture, among other things, liquid and solid, fine-grained components of the biomass accumulate in the tubes, which may clog the tubes and thus also the nozzles. In addition, in particular the mixing of warm, essentially moisture-saturated process air, conducted as recirculation air, with supplied cooler, fresh air results in formation of condensate, which collects in the piping system.

In such systems, a ventilator is generally used which is connected to a pressure chamber. The pressure chamber in turn is connected to the tubes laid in the nozzle base. The ventilator is usually situated on the roof of a corresponding compost tunnel, and is connected to the pressure chamber via a large-diameter pipeline guided along the outside of the compost tunnel. Relatively large ventilators must be used to allow the pressure chamber to be subsequently supplied with sufficient process pressure. Due to the length of the supply lines to the pressure chamber, and the fact that large portions of the pipeline systems are located outdoors, significant thermal losses also occur, so that the overall device must be operated with very high energy input.

BRIEF SUMMARY OF THE INVENTION

The object of the present invention, therefore, is to provide a device for treating organic materials of the type mentioned at the outset, in which these disadvantages do not occur, or at least occur to a much lesser extent.

According to a first embodiment, this object is achieved by a device for treating organic materials, in particular a compost tunnel, having a nozzle base, a roof, at least one rear wall, and two side walls that delimit the interior of the device, wherein extending in the nozzle base is a plurality of tubes that are connected to nozzles in the nozzle base that are directed toward the interior of the device, wherein the tubes are connected to a process gas apparatus which is designed for supplying the tubes with a process gas, in particular air, as needed, wherein the process gas apparatus includes a pressure chamber and a ventilator, wherein the ventilator is connected to the pressure chamber in such a way that it can feed the pressure chamber with process gas, wherein the pressure chamber has at least one outlet that is connected to at least one of the tubes in the nozzle base, so that the process gas may be conducted from the pressure chamber into the tubes to be fed, characterized in that the ventilator and the pressure chamber are situated on the roof of the device, in particular in an enclosure, wherein the pressure chamber is connected to the tubes via at least one connecting line situated in the rear wall, and according to a second embodiment, by a device for treating organic materials, in particular a compost tunnel, having a nozzle base, a roof, at least one rear wall, and two side walls that delimit the interior of the device, wherein extending in the nozzle base is a plurality of tubes that are connected to nozzles in the nozzle base that are directed toward the interior of the device, wherein the tubes are connected to a process gas apparatus which is designed for flushing the tubes with a process gas, in particular air, as needed, wherein the process gas apparatus includes a pressure chamber and a ventilator, wherein the ventilator is connected to the pressure chamber in such a way that it can feed the pressure chamber with process gas, wherein the pressure chamber has at least one outlet that is connected to at least one of the tubes in the nozzle base, so that the process gas may be conducted from the pressure chamber into the tubes to be fed, characterized in that the ventilator and the pressure chamber are situated on the side of the rear wall of the device facing away from the interior, in particular in an enclosure, wherein the pressure chamber is situated in the area of the nozzle base. Advantageous refinements are set forth in the dependent claims.

The device according to the invention for treating organic materials, in particular aerobic treatment thereof, which in particular is a compost tunnel, includes a nozzle base, a roof, at least one rear wall, and two side walls that delimit the interior of the device. One end-face wall of such a device is formed by the rear wall, while the other end-face wall at the front side is typically closed by a closable opening, in particular a tunnel gate. Extending in the nozzle base is a plurality of tubes that are connected to nozzles in the nozzle base that are directed toward the interior of the device. The tubes are connected to a process gas apparatus which is designed for supplying the tubes with a process gas, in particular air, as needed. The process gas apparatus includes a pressure chamber, in which in particular the process gas is distributed, and a ventilator. The ventilator is connected to the pressure chamber in such a way that it can feed the pressure chamber with process gas. The pressure chamber in turn has at least one outlet that is connected to at least one of the tubes in the nozzle base, in particular in a fluid-conducting manner, so that the process gas may be conducted from the pressure chamber into the tubes to be fed.

According to the first embodiment of the present invention, the ventilator and the pressure chamber are situated on the roof of the device, in particular in an enclosure. The pressure chamber is connected to the tubes, in particular in a fluid-conducting manner, via at least one connecting line situated in the rear wall. A number of advantages result from the supply line to the tubes being laid in the rear wall of the device. One advantage is that heat losses may be minimized due to the fact that the supply lines between the ventilator and the tubes in the nozzle base may be situated inside heat insulation that thermally shields with respect to the outer side of the device.

It is preferably provided that a plurality of connecting lines is integrated into the rear wall, in particular between heat insulation that is present in or on the outer side of the rear wall, and the inner side of the rear wall facing the interior. According to one special embodiment, the number of connecting lines corresponds to the number of tubes in the nozzle base. For example, this allows only individual tubes in the nozzle base to be fed as needed, for example when corresponding closing valves are provided on each of the connecting lines.

According to another variant, it may be provided that at least some of the plurality of connecting lines in the rear wall are combined into at least one consolidated line, and the at least one consolidated line opens into the pressure chamber. Thus, even though all tubes in the nozzle base are to be fed at the same time, it is possible to distribute the feeding of the connecting lines over a few connections to the pressure chamber. This allows in particular a much more compact design of the pressure chamber, which, for example, then no longer has to be provided over the complete width of the device. In addition to installation space, this naturally saves on costs, which may vary depending on the size of the pressure chamber.

According to another independent solution of the object according to the invention corresponding to a second embodiment of the present invention, it is provided that the ventilator and the pressure chamber are situated on the side of the rear wall of the device facing away from the interior, in particular in an enclosure. The pressure chamber is situated in the area of the nozzle base. The result in particular is that heat losses through external connecting lines may be minimized due to the fact that the connecting lines may be dispensed with, or at least the length may be significantly reduced.

To this end, it may be provided in particular that the pressure chamber is directly connected to the tubes situated in the nozzle base. The connecting lines may thus be dispensed with. It is necessary only to provide appropriate connecting flanges or at least one connecting flange at the pressure chamber. For this purpose, it may be provided in particular that the pressure chamber is fastened, in particular flanged, near the rear wall in the floor area.

In addition, according to another advantageous variant of this embodiment the heat loss may be minimized by connecting the ventilator directly to the pressure chamber.

Overall, the present invention in all embodiments also optimizes the discharge of condensate from the pressure chamber. Such condensates form in particular due to mixing of fresh air (cold) and recirculation air (warmer and moist) during operation of the device. These condensates naturally pass into the tubes in the nozzle base, and may be discharged from the pipeline system, upstream from the nozzles, by the gas feeding operation according to the invention. The same applies for press water and solid components that pass into the tubes through the openings of the nozzles in the nozzle base due to operation of the facility. To optimize the discharge, according to one preferred variant of all embodiments according to the invention it is provided that the nozzle base has a downward slope from the rear wall to the front side.

To minimize thermal losses, it may also be provided that the walls of the enclosure and/or the nozzle base and/or the roof and/or the at least one rear wall and/or one or both side walls and/or the closable opening have/has heat insulation toward their/its outer side. Thermal losses are reduced in particular due to the fact that any connecting lines or pipelines are situated inside the insulation material, relative to the interior of the device.

Lastly, likewise for all embodiments, it may be provided that the pressure chamber is made of metal.

BRIEF DESCRIPTION OF THE DRAWINGS

The invention is explained in greater detail below with reference to the exemplary embodiments illustrated in FIGS. 1 through 6.

DETAILED DESCRIPTION OF PREFERRED EMBODIMENTS

In the following discussion, with regard to the device according to the invention, reference is made to a compost tunnel for the sake of simplicity. However, the invention is not limited to devices that are used for the decomposition of biomass. Rather, biomass may also be treated in similar devices in which no composting process is carried out.

The device 1 according to the invention is shown in a first embodiment in FIGS. 1 through 4. The device has a roof 5, a rear wall 4, a floor 2, and side walls 10, 11. Reference numeral 15 denotes the optionally closable front side of the compost tunnel 1, through which the compost tunnel may be loaded with biomass. The mentioned walls enclose the interior 3. The tubes 7 extend in the longitudinal direction shown in FIG. 1 in the floor, which is designed as a nozzle base 2. The tubes 7 are connected to nozzles that are directed toward the interior 3, so that a fluid (gas or liquid) that flows in the tubes 7 may escape through the nozzles into the interior 3. In the example shown, the floor 2 has a downward slope from the rear wall 4 to the front side 15. In the area of the front side 15, the tubes 7 open into downpipes 13, which in turn open into a collecting line 14 via which the discharge of a fluid from the tubes 7 is possible. An enclosure 6 is situated on the roof 5, preferably in the area of the rear wall 4; a process gas apparatus that has a ventilator 12 and a pressure chamber 9 connected thereto is situated within the enclosure 6. A process gas, in particular air, that is blown into the pressure chamber 9 by the ventilator 12 passes through connecting lines 8 which are provided in the rear wall 4, and which on one side are in fluidic connection with the pressure chamber 9, and on the other side are in fluidic connection with the tubes 7, and passes into the tubes 7, so that any condensates present in the piping system, as well as press water that passes from the interior 3 through the nozzle openings and into the tubes 7 due to the biomass process, and also contained solid components, may be discharged from the piping system, in particular the tubes 7, by means of the process gas. For each tube 7 in the nozzle base 2, a corresponding connecting line 8 is preferably present between the particular tube 7 and the pressure chamber 9.

Due to the fact that the walls of the device according to the invention may be insulated, the connecting lines 8 are situated inside the insulation, relative to the interior 3 of the device 1. This means that a possibly cold environment (air or moisture, for example) may have a greatly reduced influence on the connecting lines 8, so that the system is optimized from a thermal standpoint.

Figure 1:
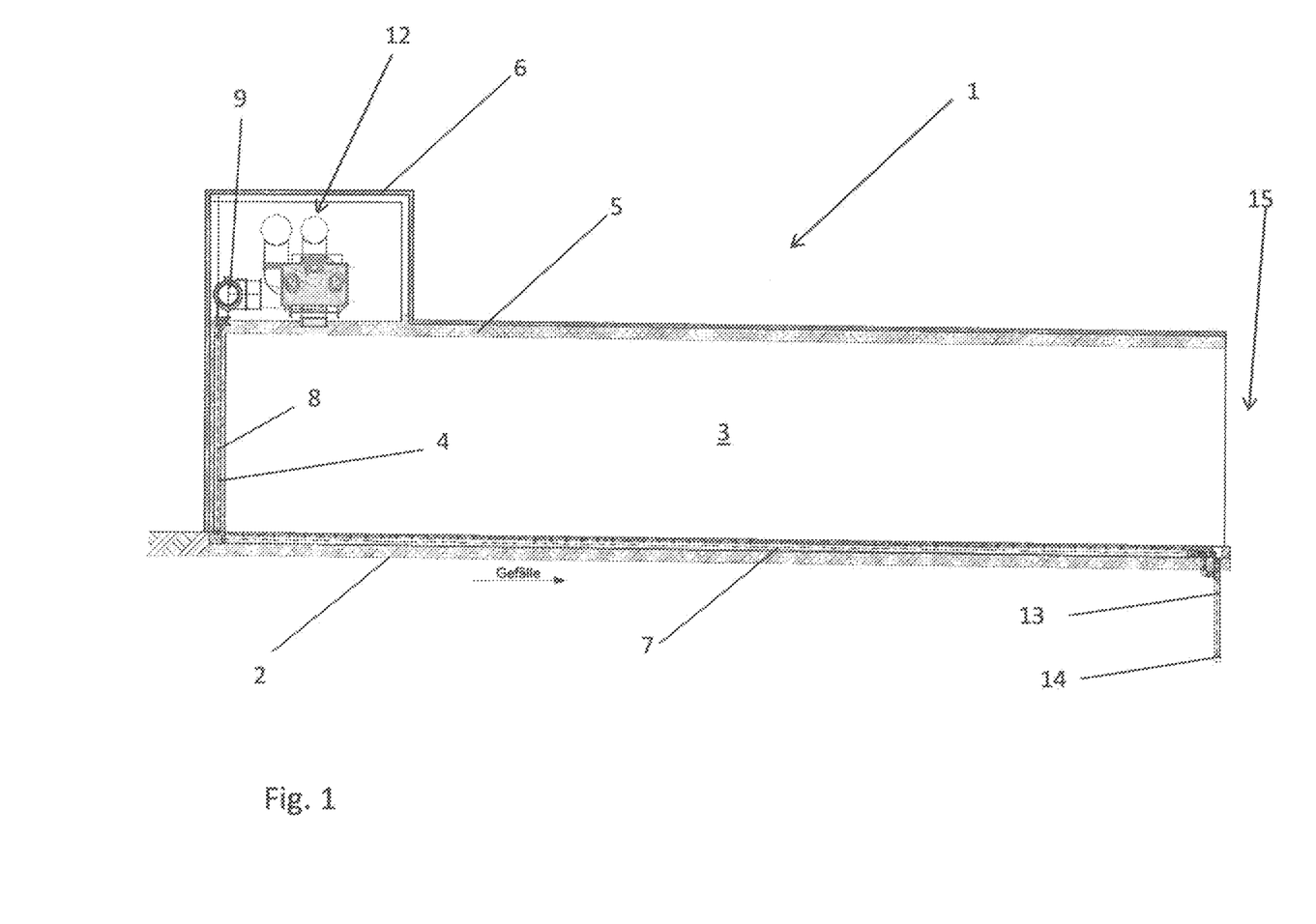
FIG. 1 shows a longitudinal section of a device according to the invention according to a first embodiment, which may be designed in particular as a compost tunnel.
Figure 2:
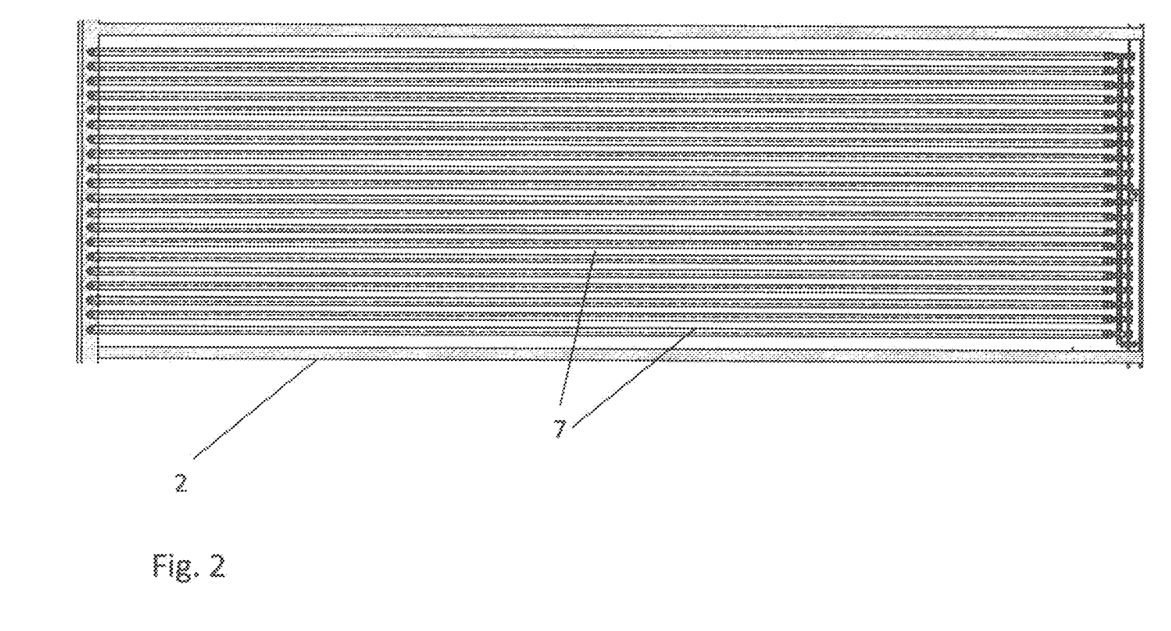
FIG. 2 shows a longitudinal section, transverse to the plane of the drawing in FIG. 1, through the device according to the invention, above the nozzle base.
Figure 3:
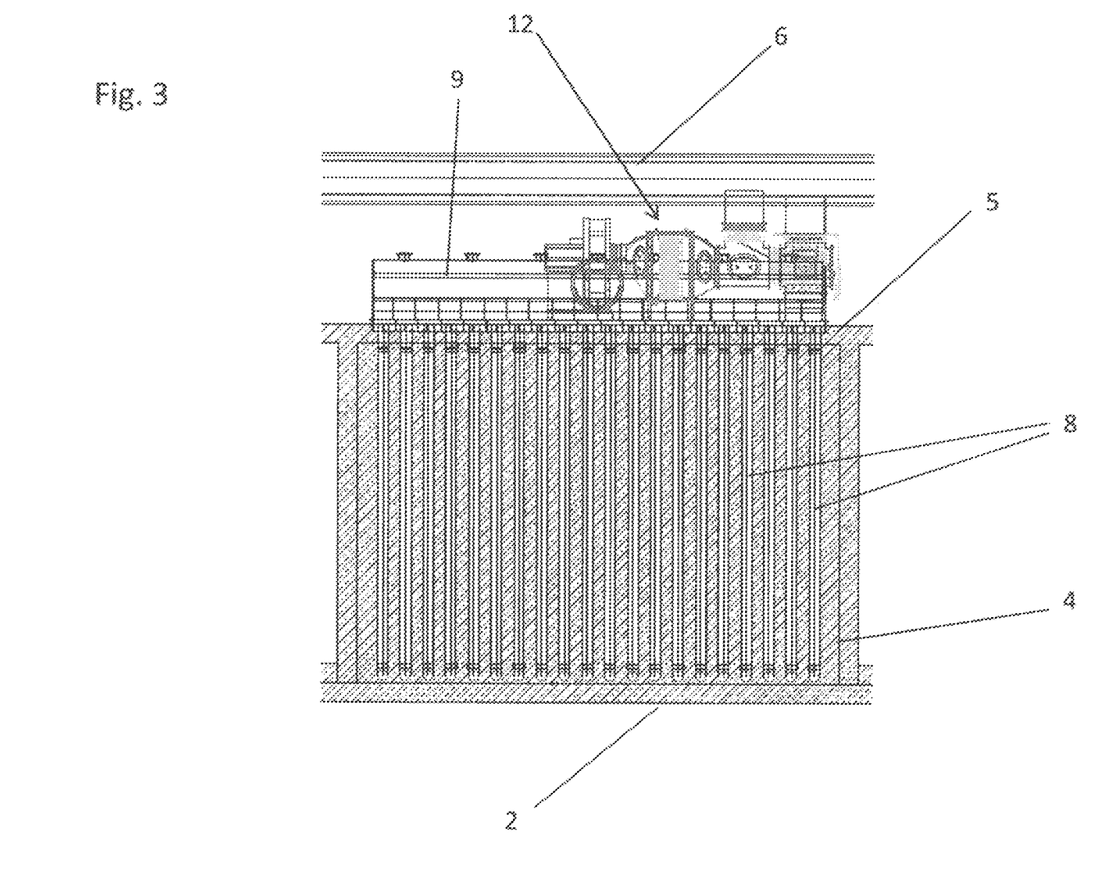
FIG. 3 shows a cross section of the device according to the invention according to FIG. 1 in the area of the rear wall.
Figure 4:
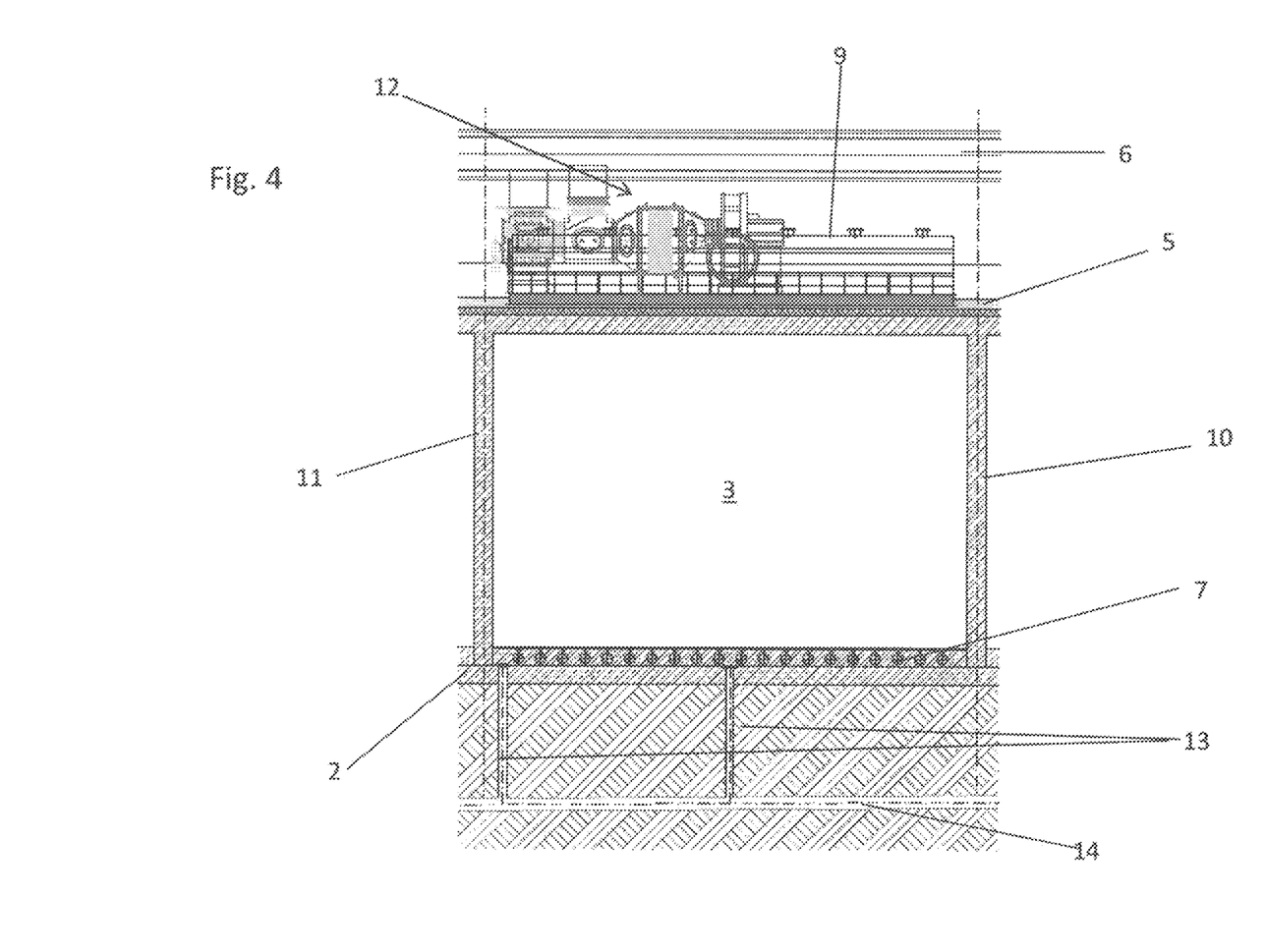
FIG. 4 shows a cross section of the device according to the invention according to FIG. 1 in the area of the front side.
Figure 5:
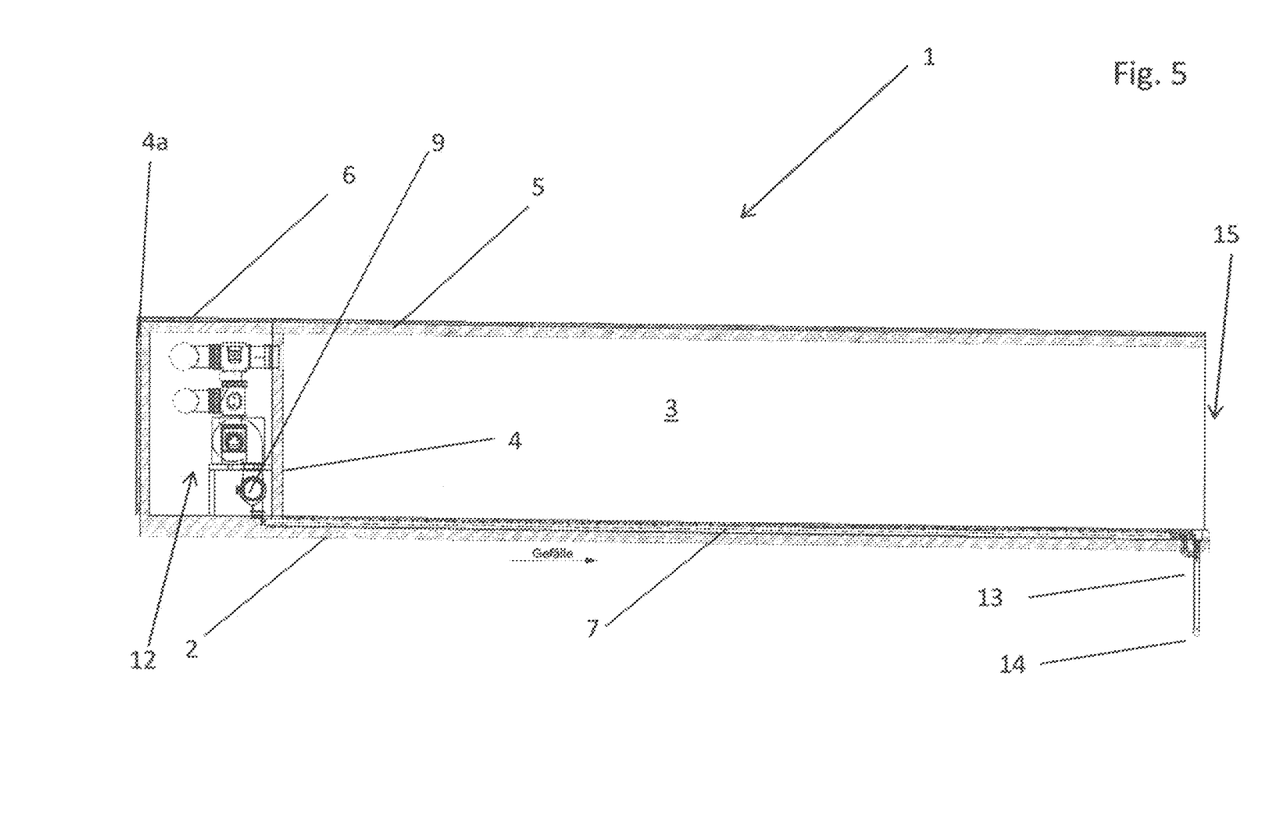
FIG. 5 shows a longitudinal section of a device according to the invention according to a second embodiment, which may be designed in particular as a compost tunnel.
Figure 6:
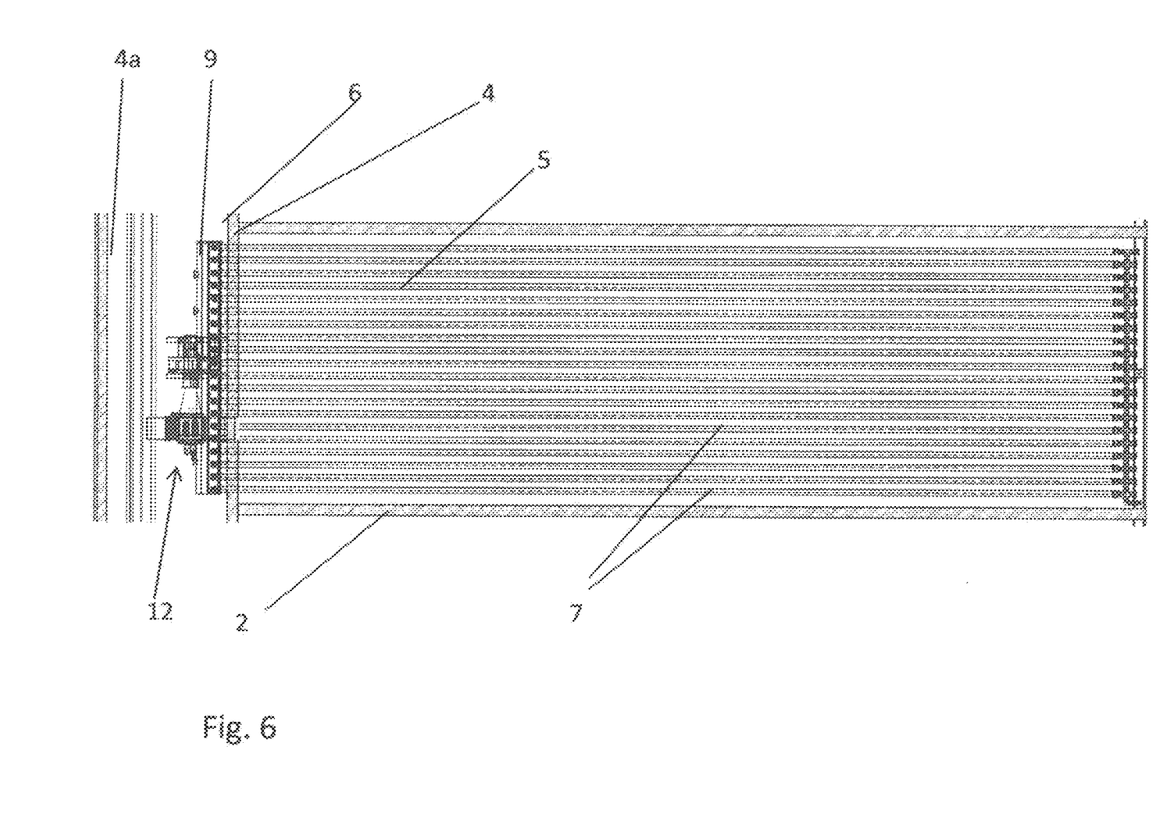
FIG. 6 shows a longitudinal section, transverse to the plane of the drawing in FIG. 5, through the device according to the invention, above the nozzle base.

A similar effect may be achieved with the embodiment shown in FIGS. 5 and 6 by providing the enclosure 6 behind the rear wall 4. Once again, the process gas apparatus having the ventilator 12 and also the pressure chamber 9 connected thereto is situated within this enclosure 6, which is delimited at the rear by another rear wall 4a. On the one hand, the enclosure 6, the same as in the example mentioned above, may be thermally insulated, so that heat losses are largely avoided. On the other hand, this embodiment has the advantage that the conduction paths may be kept very short, in particular due to the fact that fairly long connecting lines 8 (compare to the embodiment according to FIGS. 1 through 4) may be dispensed with. Here as well, a downward slope from the rear wall 4, which delimits the interior 3 at the rear, in the direction of the front side 15 of the device 1, designed as a compost tunnel, for example, but also not limiting here, may facilitate the discharge of condensate, press water, and solid components. When identical reference numerals are used, reference is made to the discussion concerning the first embodiment.

In the present embodiment, the pressure chamber 9 is situated at the rear side of the rear wall 4 near the floor, and preferably is flanged to the floor near the rear wall 4. The flanges or the individual flange establish(es) a fluidic connection of the pressure chamber 9 to the tubes 7. Therefore, longer connecting lines are unnecessary. Also in this embodiment, in particular the ventilator 12 is preferably situated directly at the pressure chamber 9, so that here as well, any losses due to shortening the flow paths are minimized. In this case as well, appropriate insulation in the individual walls or all walls, which in particular enclose the ventilator 12 and the pressure chamber 9, may minimize the thermal losses to a great extent.

What is claimed is:

1. A compost tunnel device (1) for treating organic materials, the device (1) having a nozzle base (2), a roof (5), at least one rear wall (4), and two side walls (10, 11) that delimit the interior (3) of the device (1), wherein extending in the nozzle base (2) is a plurality of tubes (7) that are connected to nozzles in the nozzle base (2) that are directed toward the interior (3) of the device (1), wherein the tubes (7) are connected to a process gas apparatus (12, 9) which is designed for supplying the tubes (7) with air as a process gas, as needed, wherein the process gas apparatus (9, 12) includes a pressure chamber (9) and a ventilator (12), wherein the ventilator (12) is connected to the pressure chamber in such a way that it can feed the pressure chamber with process gas, wherein the pressure chamber (9) has at least one outlet that is connected to at least one of the tubes (7) in the nozzle base (2), so that the process gas may be conducted from the pressure chamber (9) into the tubes (7) to be fed,
wherein the ventilator (12) and the pressure chamber (9) are situated in an enclosure (6) on the roof (5) of the device (1), wherein the pressure chamber (9) is connected to the tubes (7) via at least one connecting line (8) situated in the rear wall (4).

2. The device (1) according to claim 1, wherein a plurality of connecting lines (8) is integrated into the rear wall (4) between heat insulation that is present in the rear wall (4) and the inner side of the rear wall (4) facing the interior (3).

3. The device (1) according to claim 2, wherein the number of connecting lines (8) corresponds to the number of tubes (7).

4. The device (1) according to claim 2, wherein at least some of the plurality of connecting lines (8) in the rear wall (4) are combined into at least one consolidated line, and the at least one consolidated line opens into the pressure chamber (9).

5. A compost tunnel device (1) for treating organic materials, the device (1) having a nozzle base (2), a roof (5), at least one rear wall (4), and two side walls (10, 11) that delimit the interior (3) of the device (1), wherein extending in the nozzle base (2) is a plurality of tubes (7) that are connected to nozzles in the nozzle base (2) that are directed toward the interior (3) of the device (1), wherein the tubes (7) are connected to a process gas apparatus (12, 9) which is designed for flushing the tubes (7) with air as a process gas, as needed, wherein the process gas apparatus (9, 12) includes a pressure chamber (9) and a ventilator (12), wherein the ventilator (12) is connected to the pressure chamber in such a way that it can feed the pressure chamber with process gas, wherein the pressure chamber (9) has at least one outlet that is connected to at least one of the tubes (7) in the nozzle base (2), so that the process gas may be conducted from the pressure chamber (9) into the tubes (7) to be fed,
wherein the ventilator (12) and the pressure chamber (9) are situated in an enclosure (6) on the side of the rear wall (4) of the device (1) facing away from the interior (3), wherein the pressure chamber (9) is situated in the area of the nozzle base (2),
wherein the nozzle base (2) has a downward slope from the rear wall (4) to the front side (15), and
wherein the walls of the enclosure (6) and/or the nozzle base (2) and/or the roof (5) and/or at least one rear wall (4, 4a) and/or one or both side walls (10, 11) and/or a closable opening have/has heat insulation toward their/its outer side.

6. The device (1) according to claim 5, wherein the pressure chamber (9) is directly connected to the tubes (7) situated in the nozzle base (2).

7. The device (1) according to claim 5, wherein the ventilator (12) is directly connected to the pressure chamber (9).

8. The device (1) according to claim 5, wherein the pressure chamber is fastened to the tunnel device (1) near the rear wall (4) in the floor area.

9. The device (1) according to claim 5, wherein the pressure chamber (9) is made of metal.

10. A compost tunnel device (1) for treating organic materials, the device (1) having a nozzle base (2), a roof (5), at least one rear wall (4), and two side walls (10, 11) that delimit the interior (3) of the device (1), wherein extending in the nozzle base (2) is a plurality of tubes (7) that are connected to nozzles in the nozzle base (2) that are directed toward the interior (3) of the device (1), wherein the tubes (7) are connected to a process gas apparatus (12, 9) which is designed for flushing the tubes (7) with air as a process gas, as needed, wherein the process gas apparatus (9, 12) includes a pressure chamber (9) and a ventilator (12), wherein the ventilator (12) is connected to the pressure chamber in such a way that it can feed the pressure chamber with process gas, wherein the pressure chamber (9) has at least one outlet that is connected to at least one of the tubes (7) in the nozzle base (2), so that the process gas may be conducted from the pressure chamber (9) into the tubes (7) to be fed, wherein the ventilator (12) and the pressure chamber (9) are situated in an enclosure (6) on the side of the rear wall (4) of the device (1) facing away from the interior (3), wherein the pressure chamber (9) is situated in the area of the nozzle base (2),
   wherein the pressure chamber (9) is fastened to the tunnel device (1) near the rear wall (4) in the floor area and is directly connected to the tubes (7) situated in the nozzle base (2),
   wherein the ventilator (12) is directly connected to the pressure chamber (9),
   wherein the nozzle base (2) has a downward slope from the rear wall (4) to the front side (15), and
   wherein the walls of the enclosure (6) and/or the nozzle base (2) and/or the roof (5) and/or at least one rear wall (4, 4*a*) and/or one or both side walls (10, 11) and/or a closable opening have/has heat insulation toward their/its outer side.

11. The device (1) according to claim 10, wherein the pressure chamber (9) is made of metal.

\* \* \* \* \*